UNITED STATES PATENT OFFICE.

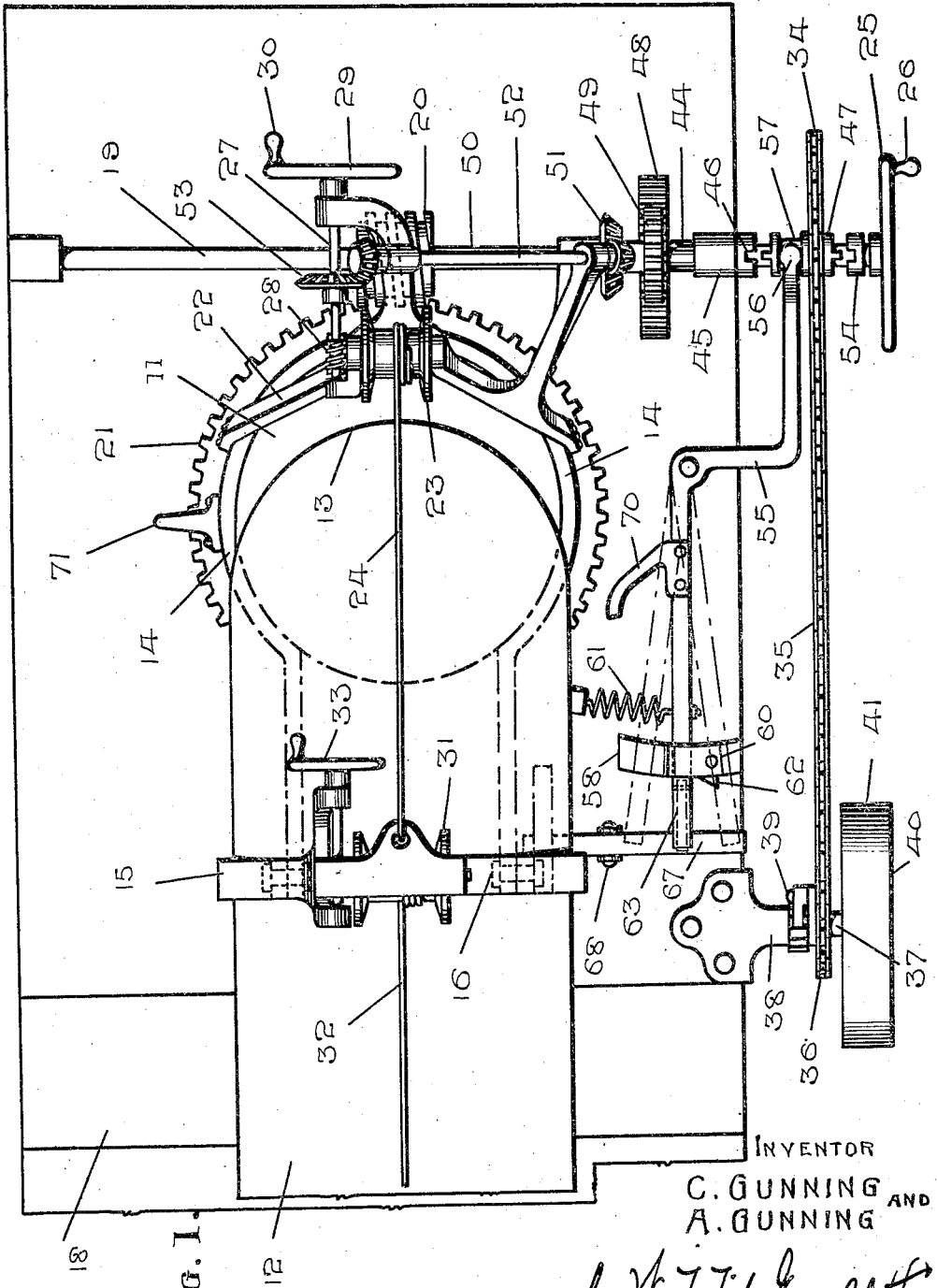

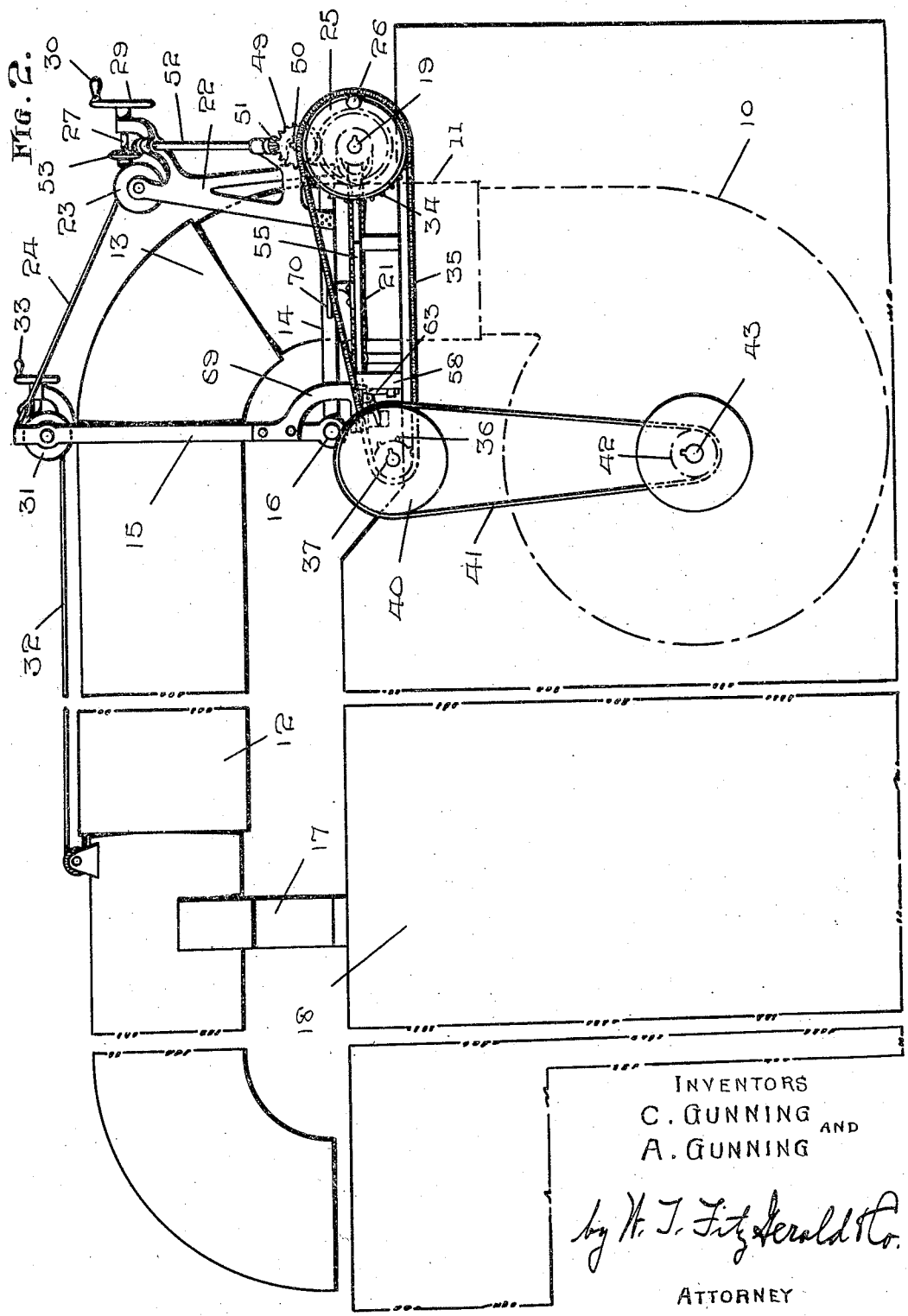

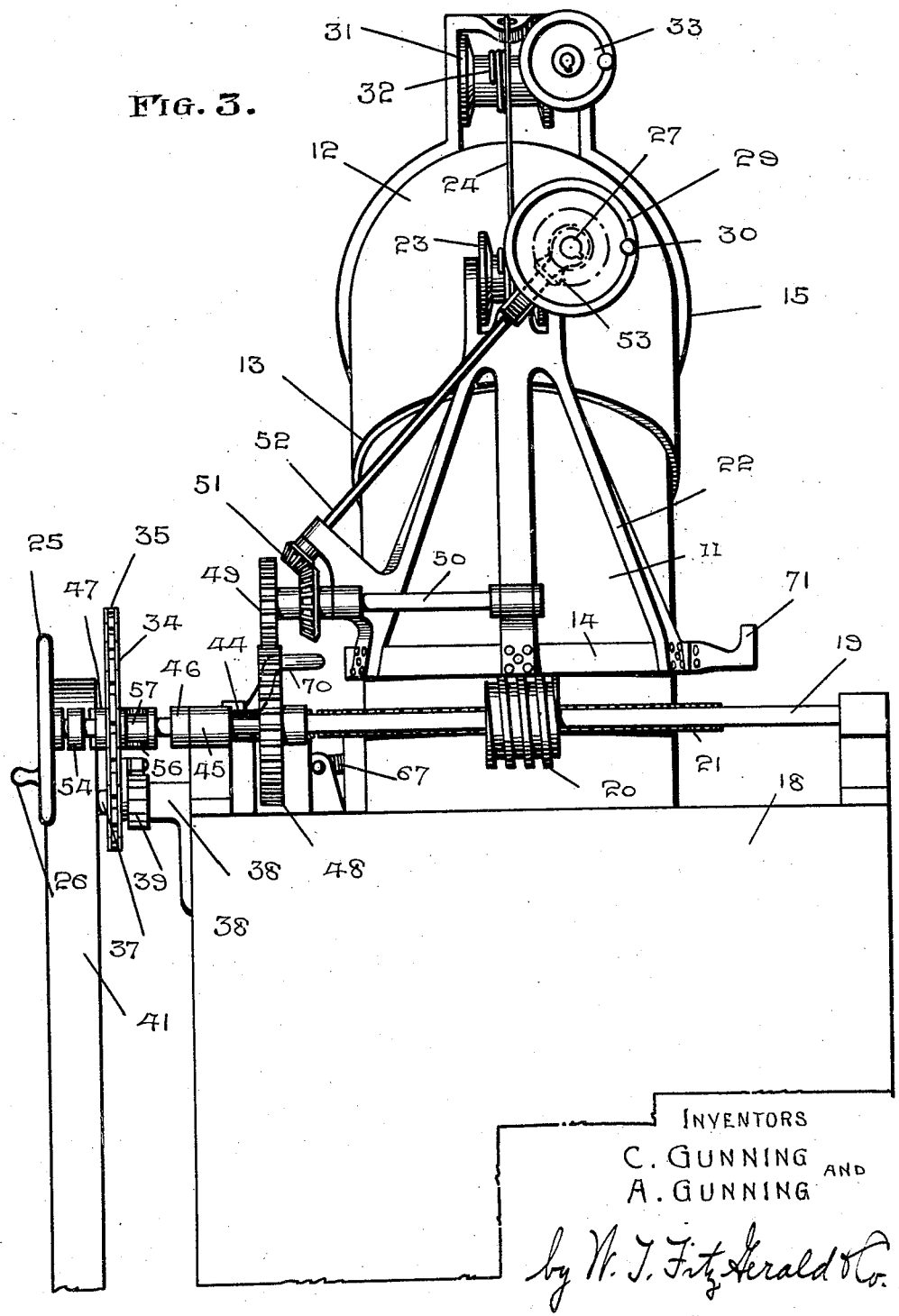

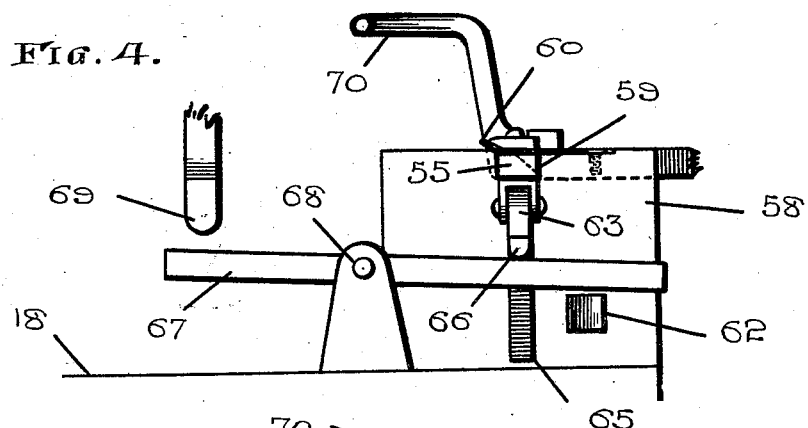
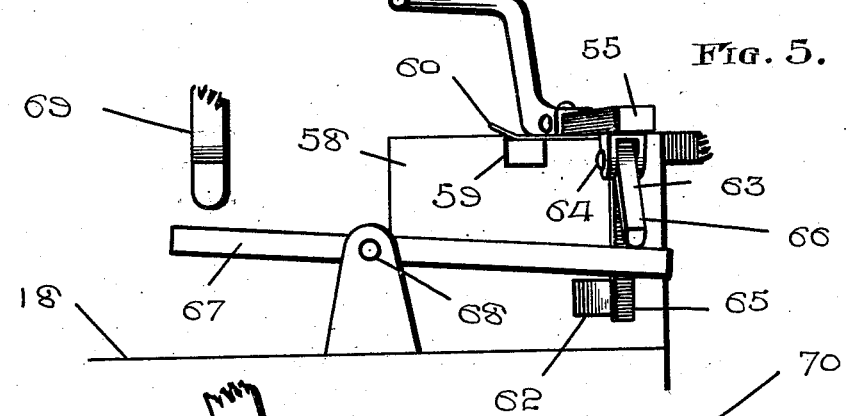
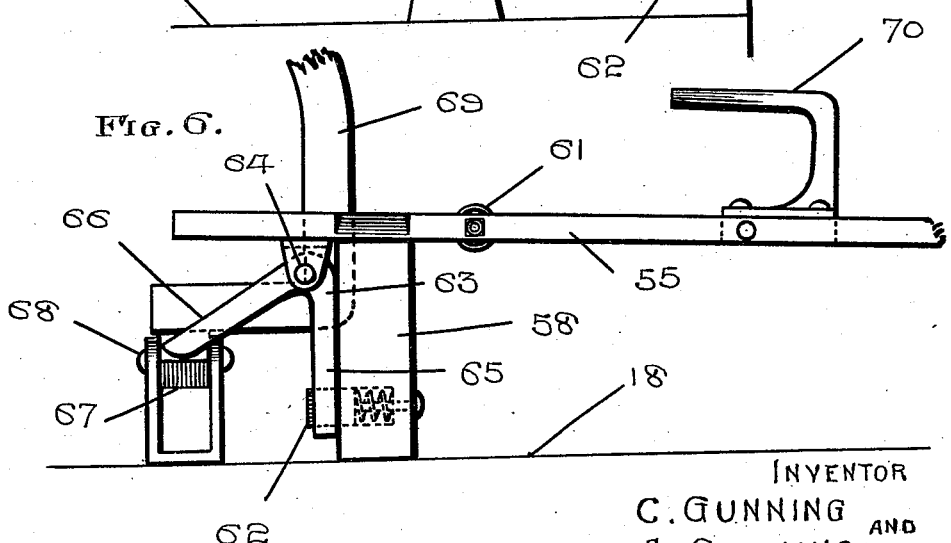

CHRISS GUNNING AND ALFRED GUNNING, OF LANSFORD, NORTH DAKOTA.

BLOWER-DISCHARGE-PIPE-OPERATING DEVICE.

1,421,080.  Specification of Letters Patent.  Patented June 27, 1922.

Application filed June 20, 1921. Serial No. 479,033.

*To all whom it may concern:*

Be it known that we, CHRISS GUNNING and ALFRED GUNNING, citizens of the United States, residing at Lansford, in the county of Bottineau and State of North Dakota, have invented certain new and useful Improvements in Blower-Discharge-Pipe-Operating Devices; and we do hereby declare the following to be a full, clear, and exact description of the invention, such as will enable others skilled in the art to which it appertains to make and use the same.

The present invention relates to operating mechanisms for the blower discharge pipes of threshing machines, and the like, and aims to provide novel and improved means for automatically raising and turning or moving the blower discharge pipe to position when the machine is started, thereby saving time and labor.

Another object of the invention is the provision of a novel mechanism for automatically controlling the blower discharge pipe, when the machine is started, so as to raise said pipe and then turn or swing same from idle to operative position, ready for the discharge of the straw, chaff, or the like, and eliminating the time and manual labor usually required for such work preparatory to starting the machine.

A further object is the provision of such an automatic mechanism which can be incorporated in or combined with the ordinary operating device of the blower discharge pipe, whereby the pipe can be controlled manually as usually, and, in addition, can be automatically moved to discharging or delivering position when the machine is started.

A still further object is the provision of such a mechanism including novel actuating gearing and controlling means for the automatic control of the gearing, when the machine is started, to accomplish the raising and turning movements of the blower discharge pipe without manual attention.

It is also an object of the invention to provide such a mechanism which is comparatively simple and inexpensive in construction, as well as being practical and efficient in use.

With the foregoing and other objects in view, which will be understood as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a plan view showing the mechanism in inactive or idle position.

Fig. 2 is a side elevation on a reduced scale, of the threshing machine, portions being broken away, with the blower discharge pipe in idle position.

Fig. 3 is an end view of the machine, showing the mechanism, on the same scale as Fig. 1.

Fig. 4 is an enlarged elevation, in detail, of the controlling device in neutral or idle position.

Fig. 5 is a similar view showing the device in set position preparatory to starting the machine.

Fig. 6 is a side elevation of the parts as seen in Fig. 5, looking at right angles to the line of view in Fig. 5.

The numeral 10 designates the blower of a threshing or similar machine, having an upstanding outlet portion on which a vertical sleeve 11 is rotatable about a vertical axis, and the discharge pipe 12 extends from said sleeve or pipe section 11. Said pipe 12 and sleeve 11 have a telescopic elbow joint 13, permitting the pipe 12 to be swung upwardly and downwardly, and the pipe 12 may be of telescopic construction, to be extended and retracted, as well known. A band 14 embraces the sleeve 11, and a band 15 embraces the pipe 12 adjacent to the elbow joint between said sleeve and pipe, and said bands 14 and 15 are hingedly connected, as at 16, whereby the band 15 swings with the pipe 12. The telescopic elbow joint 13 is curved around the transverse axis of the hinge 16, whereby the adjacent ends of the sleeve 11 and pipe 12 slide one on the other when the pipe is raised and lowered.

A support 17 for the pipe 12 is mounted on the casing 18 of the machine, and the pipe rests on said support over the casing, when in idle position.

The ordinary manual operating device of the lower discharge pipe includes a transverse shaft 19 mounted on the casing 18, and having a worm 20 secured thereon meshing with a worm wheel 21 surrounding and secured to the sleeve 11, and said shaft 19 has a hand wheel 25 at one end provided with a crank handle 26, for turning the shaft 19, so as to turn the pipe 12 about the vertical axis of the sleeve 11. The operating device further includes a drum 23 mounted on a bracket 22 supported by the band 14, and a cable 24 wound on said drum and connected to the upper portion of the band 15 or other portion, whereby the cable in being wound on the drum, will swing the pipe 12 upwardly. A shaft 27 journaled on the bracket 22 is connected by gears 28, with the drum 23, and has a hand wheel 29 with a crank handle 30 for convenience in rotating the drum 23 by hand, for raising or lowering the pipe 12. A drum 31 is also usually supported by the band 15 above the pipe, and a cord 32 is wound on the drum 31 for extending the pipe 12, as well known, and a hand wheel 33 is provided for operating the drum 31, similar to the hand wheel for the drum 23.

It is necessary, with such manual operating device, before starting the machine, to rotate the drum 23 so as to wind the cable 24 thereon, and raise the pipe 12, and to then rotate the shaft 19, for turning the pipe out from over the casing 18, which is a laborious operation, as well as consuming time.

In carrying out the invention, in order to automatically move the pipe 12 to delivery position, actuating gearing is provided to be driven by the machine for operating the devices for raising and turning the pipe 12. Thus, a sprocket wheel 34 is mounted loosely on one projecting terminal of the shaft 19, at one side of the casing 18, and is connected by an endless sprocket chain 35 with a sprocket wheel 36 mounted loosely on a stud shaft 37 supported by a bearing 38 secured to the frame 18. A ratchet 39 connects the sprocket wheel 36 with the shaft 37, and a pulley wheel 40 secured on said shaft 37 is connected by an endless belt 41 with a pulley wheel 42 secured on the shaft 43 of the blower 10. Thus, when the blower is operated, the motion of the shaft 43 is imparted to the sprocket wheel 34, which is slidable on the shaft 19, the chain 35 being sufficiently flexible transversely to permit of the slight shifting movement of said sprocket wheel. The ratchet 39 will prevent the sprocket wheels 36 and 34 from being driven when the lower shaft 43 is rotated in the reverse or backward direction, to thereby avoid the backward operation of the blower discharge pipe operating means.

A sleeve 44 is rotatable on the shaft 19 within one of the bearings 45 of said shaft 19, and has a clutch portion 46 at its outer end for the engagement of the clutch hub 47 of the sprocket wheel 34 when said sprocket wheel is moved inwardly from intermediate or neutral position. A gear wheel 48 is secured on the inner end of the sleeve 44 and meshes with a gear wheel 49 secured on a shaft 50 journaled in the bracket 42. The shaft 50 is connected by bevel gears 51 with an inclined shaft 52 journaled in the bracket 22, and the upper end of the shaft 52 is connected by bevel gears 53 with the shaft 27 which controls the drum 23. Consequently, when the wheel 34 is shifted inwardly into engagement with the sleeve 44, the sleeve is rotated, thereby imparting rotary movement to the shaft 27, for turning the drum 23 to wind the cable 24 thereon.

A clutch member 54 is secured on the shaft 19 at the outer side of the wheel 34, for the engagement of the clutch hub 47 of said wheel when the wheel is shifted outwardly from intermediate or neutral position, thereby rotating the shaft 19 to turn the sleeve 11 and pipe 12.

The controlling device for shifting the wheel 34 and its clutch hub or member 47, includes a lever 55 fulcrumed on the casing 18 between the ends of the lever, and the lever has a fork 56 at one end engaging in a groove 57 in the hub 47, whereby when the lever is swung, the wheel 34 is shifted longitudinally on the shaft 19. One arm of the lever is thus connected to the clutch device, and the other arm extends over a member or quadrant 58 which has a notch or recess 59 in its upper edge into which the lever 55 springs downwardly when the lever is returned to neutral or intermediate position. A leaf spring 60 is secured on the member 58 and projects above the notch 59, whereby when the lever is moved inwardly, from the position as seen in Fig. 5, it will pass over the spring, to prevent the lever from dropping into the notch 59, whereas when the lever is moved outwardly from its inner position, it will pass under the spring 60 to move down into the notch 59. Said spring thus serves to permit the lever to move inwardly over the notch 59, and to cause the lever to move into said notch when moved outwardly.

In order to hold the lever 55 in its outwardly set position, as seen in Fig. 5, a bevelled spring catch 62 is mounted in the member 58, and an angular tripping member 63 is pivoted at its elbow, as at 64, to the lever 55 under said lever, with one arm 65 of said member bearing against the member 58 to engage behind the catch 62 when the lever 55 is swung outwardly to set the device. The other arm 66 of the member 63 projects from the member 58 over one arm of a tripper lever 67, which is fulcrumed between its ends, as at 68, on the casing or support 18. A depresser member 69 is secured to the band 15, so that when the pipe 12 is raised, said member 69 in moving down, will contact with and depress one arm of the lever 67 which extends below said member 69, to raise the other arm which extends under the arm 66 of the tripping member 63. This will swing the arm 65 away from the member 58 and stop or catch 62. A spring 61 is connected to the lever 55 for swinging said lever inwardly, and a cam 70 is secured to the lever for the engagement of a wiper member 71 secured to the band 14, when the pipe 12 is turned through about one-half of a circle to bring the pipe to delivery position.

The mechanism is set, before the machine is operated, so that when the machine is started, the mechanism operates to automatically position the lower discharge pipe 12. In order to set the mechanism, the lever 55 is raised out of the notch 59 and moved over the spring 60 to the position as shown in Fig. 5, with the tripping member 63 engaging the catch 62, thereby holding the lever in set position, with the clutch hub 47 of the actuating gearing in engagement with the sleeve 44. The spring 61 is brought under tension by the movement of the lever 55 to outwardly set position. Now, when the machine is started, the rotation of the blower shaft 43 will impart rotation to the sprocket wheel 34 and sleeve 44, thereby rotating the drum 23 to wind the cable 24 thereon. This will raise the pipe 12, and when the pipe is raised to a predetermined amount, the depresser member 69 will contact with and swing the lever 67, which will in turn raise the arm 66 and swing the tripping member 63 out of engagement with the catch 62. The spring 61 will then come into play and will swing the lever 55 inwardly, said lever riding over the spring 60 and moving to its inner position. The actuating gearing is therefore disconnected from the sleeve 44, and connected to the shaft 19 by the outward shifting of the wheel 34 to engage the clutch hub 47 thereof with the clutch member 54. The shaft 19 is now rotated, whereby the worm 20 will turn the sleeve 11 and pipe 12 to swing the pipe out from over the casing 18, thus moving the pipe to delivery position. When the pipe reaches delivery position, the wiper member 71 will come into contact with the cam 70, thereby swinging the lever 55 outwardly and disengaging the clutch hub 47 from the clutch member 54 to stop the turning movement of the pipe 12, and the lever 55 is shoved under the spring 60 and will snap or drop into the notch 59, thereby retaining the lever 55 and clutch in intermediate or neutral position, until the device is again set after the machine has completed its work and is idle. When the controlling device is in neutral position, the hand wheels 25, 29 and 33 can be operated by hand, as usual, for controlling the lower discharge pipe in the customary way. The present mechanism will, therefore, not interfere with the ordinary control of the discharge pipe, but will save time and labor, by automatically moving the blower discharge pipe to delivery position, when the machine is started, after the device has been set.

Having thus described the invention, what is claimed as new is:—

1. The combination with a blower and its discharge pipe movable upwardly and downwardly and around a vertical axis, of power-driven actuating means, and automatic means controlling said pipe to be operated by said actuating means and operable automatically in succession for raising said pipe and then turning it from inactive to delivery position.

2. The combination with a blower and its discharge pipe movable to inactive and delivery positions, of power-driven actuating means, different controlling means for said pipe to move same about different axes to different positions, and automatic clutch means for connecting said controlling means in succession with the actuating means for the successive automatic movements of said pipe about the different axes.

3. The combination with a blower and its discharge pipe movable upwardly and downwardly and around a vertical axis to idle and delivery positions, of power-driven actuating means, controlling means for said pipe to raise and lower it, other controlling means for said pipe to turn it about said axis, and clutch means operable automatically for connecting said controlling means in succession with the actuating means for the automatic movement of said pipe, first upwardly at idle position and then to delivery position.

4. The combination with a blower and its movable discharge pipe, of actuating means, different controlling means for moving said pipe about different axes from one position to another, clutch means for connecting said controlling means in succession with the actuating means adapted to be set for the automatic movement of said pipe about said axes in succession, and means controlling said clutch means for disconnecting the actuating and controlling means when the pipe is moved to its intended positions in succession.

5. The combination with a blower and its discharge pipe movable upwardly and downwardly and about a vertical axis, of actuating means, controlling means for said pipe to raise and lower it, other controlling means for said pipe to turn same about said axis, clutch means for alternately connecting said controlling means with the actuating means, and adapted to be set with the first named controlling means connected to the actuating means for automatically raising the pipe when the blower is started, means controlling said clutch means for disconnecting the firstnamed controlling means from and connecting the secondnamed controlling means to the actuating means, when the discharge pipe is raised, to thereby turn same to delivery position, and means also controlling the clutch means for disengaging the secondnamed controlling means from the actuating means when the pipe is turned to delivery position.

6. The combination with a blower and its discharge pipe movable upwardly and downwardly and about a vertical axis to idle and delivery positions, of actuating means, controlling means for said pipe to raise and lower it, other controlling means for said pipe to turn it about said axis, a clutch device to alternately connect said controlling means with the actuating means, a member controlling said clutch device, means for retaining said member in position with the firstnamed controlling means connected to the actuating means to raise the pipe when the blower is started, means for releasing said member when the pipe is raised, means for moving said member to disengage the firstnamed controlling means from and connect the secondnamed controlling means to the actuating means, so that the pipe is turned to delivery position, means for moving said member to neutral position when the pipe is turned to delivery position, and means for retaining said member in neutral position.

In testimony whereof we have signed our names to this specification in the presence of two subscribing witnesses.

CHRISS GUNNING.
ALFRED GUNNING.

Witnesses:
BERT STUDEBAKER,
JOHN OSS.